April 20, 1954 N. R. FRIEBERG ET AL 2,675,960

CYCLE INITIATING MECHANISM FOR TEN KEY MACHINES

Filed Feb. 10, 1953 10 Sheets-Sheet 1

INVENTORS
NELSON R. FRIEBERG
& PAUL A. DALE

BY Justin W. Lunsford
Earl Beust

THEIR ATTORNEYS

CYCLE INITIATING MECHANISM FOR TEN KEY MACHINES

Filed Feb. 10, 1953

INVENTORS
NELSON R. FRIEBERG
& PAUL A. DALE
BY Justin S. Stapleton
Earl Beret
THEIR ATTORNEYS April 20, 1954 N. R. FRIEBERG ET AL 2,675,960

CYCLE INITIATING MECHANISM FOR TEN KEY MACHINES

Filed Feb. 10, 1953 10 Sheets-Sheet 3

INVENTORS
NELSON R. FRIEBERG
& PAUL A. DALE

BY Justin W. Hampton
Earl Beust

THEIR ATTORNEYS

INVENTORS
NELSON R. FRIEBERG
& PAUL A. DALE
BY Justin S. Lawston
Carl Beust
THEIR ATTORNEYS April 20, 1954 N. R. FRIEBERG ET AL 2,675,960

CYCLE INITIATING MECHANISM FOR TEN KEY MACHINES

Filed Feb. 10, 1953 10 Sheets-Sheet 5

INVENTORS
NELSON R. FRIEBERG
& PAUL A. DALE
BY Justin [signature]
Carl Beust [signature]
THEIR ATTORNEYS April 20, 1954 N. R. FRIEBERG ET AL 2,675,960

CYCLE INITIATING MECHANISM FOR TEN KEY MACHINES

Filed Feb. 10, 1953 10 Sheets-Sheet 6

INVENTORS
NELSON R. FRIEBERG
& PAUL A. DALE

BY Justin S. [signature] [signature]

THEIR ATTORNEYS

April 20, 1954 N. R. FRIEBERG ET AL 2,675,960

CYCLE INITIATING MECHANISM FOR TEN KEY MACHINES

Filed Feb. 10, 1953 10 Sheets-Sheet 7

INVENTORS
NELSON R. FRIEBERG
& PAUL A. DALE

BY Justin S. Compton
Earl Beust

THEIR ATTORNEYS

April 20, 1954 N. R. FRIEBERG ET AL 2,675,960

CYCLE INITIATING MECHANISM FOR TEN KEY MACHINES

Filed Feb. 10, 1953 10 Sheets-Sheet 8

INVENTORS
NELSON R. FRIEBERG
& PAUL A. DALE

BY Justin S. Compton
Earl Beust

THEIR ATTORNEYS

April 20, 1954 N. R. FRIEBERG ET AL 2,675,960

CYCLE INITIATING MECHANISM FOR TEN KEY MACHINES

Filed Feb. 10, 1953 10 Sheets-Sheet 9

INVENTORS
NELSON R. FRIEBERG
& PAUL A. DALE

BY Justin S. Compton
Earl Benst

THEIR ATTORNEYS

April 20, 1954 N. R. FRIEBERG ET AL 2,675,960

CYCLE INITIATING MECHANISM FOR TEN KEY MACHINES

Filed Feb. 10, 1953

10 Sheets-Sheet 10

INVENTORS
NELSON R. FRIEBERG
& PAUL A. DALE

BY Justin Kampton
Earl Beust

THEIR ATTORNEYS

Patented Apr. 20, 1954 2,675,960

UNITED STATES PATENT OFFICE 2,675,960

CYCLE INITIATING MECHANISM FOR TEN KEY MACHINES

Nelson R. Frieberg and Paul A. Dale, Ithaca, N. Y., assignors to The National Cash Register Company, Dayton, Ohio, a corporation of Maryland Application February 10, 1953, Serial No. 336,102

22 Claims. (Cl. 235—60)

This invention relates to a calculating machine and more particularly pertains to a ten-key, key-set, power-operated machine in which each of the provided digit keys may be employed, beyond its ordinary use in setting up amount data, to initiate a cycle of machine operation.

As is usual in such machines, the basic structure into which the novel structure is introduced, and with which it cooperates, includes, among other things, a totalizer having a denominational series of totalizer pinions each individually rotatable in one direction for item-entering operations and in the other direction for item-withdrawing operations; a denominational series of differential racks alined with the totalizer pinions and engageable therewith in item-entering timing or item-withdrawing timing, said racks being individually movable for the purpose; a denominational series of stop bars each coupled to an associated one of the racks by a diverging lever, by which the racks may be moved, said stop bars being given an excursion of movement in each machine operation unless otherwise restrained as a group or individually; a set of digit keys for setting up amounts, there being a digit key for each of the significant denominational digits of the numerical system used, and a zero key; a pin carriage having, arranged in denominational rows, digit-representing pins each of which may be moved from an ineffective position to an effective control position, there being in each denominational row a pin for each significant digit of that denomination, said rows of pins being side-spaced like the stop bars and the rows being equal in number thereto, the pin carriage normally being to one side of the stop bars but movable thereacross step by step so that the rows of pins come successively into alinement with the stop bars, a pin in effective position controlling the extent of movement of the stop bar alined therewith during a machine operation, and said pin carriage when in normal position having the leading denominational order of pins under the digit key stems so that operation of a digit key renders effective the pin of corresponding value thereunder; means for initiating a machine operation; means for returning the pin carriage to normal after a machine operation; and totalizer-engaging means operable to engage the racks and the totalizer for item-entering operations and item-withdrawing operations.

In known ten-key machines of this type, the step-by-step movement of the pin carriage is brought about by movement of a digit key inwardly and then outwardly, thus bringing the set pin into alinement with the proper stop bar. In the machine of this invention, a machine operation may be initiated by inward movement of a key beyond its pin-setting movement. This requires that the pin carriage be indexed on the inward movement of the key, which will then, unless means is provided to prevent it, interfere with the indexing movement of the pin carriage, as the depressed key stem will be in the path of the pin in the next row. Moreover, as the machine cycle proceeds, the depressed key stem would be in the path of the pin carriage on its restoring movement. Such interference is avoided by the construction provided in this invention. A by-pass pawl has been provided, in the bottom of each digit key stem, that will swing in either direction to avoid the consequence of interference of the types mentioned.

In pin carriage operation, as a multiple-digit number is set up, the highest-order digit is set up first, and then the lower-order digits are set up in descending series. Thus, to set up the number "1576," first the "1" key is operated, then the "5" key, then the "7" key, and finally the "6" key, in that order. On operation of the "1" key, the "1" pin of the first denominational row of pins is moved to effective position, and the pin carriage is indexed to position that pin in alinement with the lowest denominational stop bar, the units order in the decimal system. On operation of the "5" key, the "1" pin mentioned is, by reason of the second pin carriage indexing movement, shifted to aline with the next higher order stop bar, the tens stop bar in the decimal system. On the same second indexing of the pin carriage, the mentioned "5" pin is alined with the lowest denominational order stop bar, and so on. The pin carriage must be in the new position, to which it is moved by the last-operated digit key, before the machine operation is initiated, in order that the correct number shall be entered into the machine. The ordinarily-known indexing escapements used in pin carriages only bring the last pin set to effective position into controlling alinement with the lowest denominational stop bar on the upward movement of the key. This will not do where a digit key is used to initiate a machine operation, and, therefore, applicants' device provides that the pin carriage indexing to bring the last pin set to effective position to alinement with the lowest order stop bar occurs on the downward movement of the key. As such indexing will bring a new row of pins into alinement with the key stems, the depressed key will be struck by the associated pin of said new row, but the by-pass pawl on the key stem operates to prevent damage to the pin and to prevent a misoperation of the machine.

The basic machine in which the invention is embodied is of the type disclosed in application for United States Letters Patent, Serial No. 237,758, filed by Roland G. Fowler et al. on July 20, 1951, except that in that machine there is a full keyboard for controlling entry of data. That machine has been changed by this invention to the ten-key type of machine by provision of a new keyboard and associated mechanism.

Therefore, it is an object of this invention to provide a ten-key calculating machine in which the digit keys may be used, beyond their ordinary function of setting up data in a pin carriage, to initiate a machine operation at the will of the operator.

It is a further object of this invention to provide novel key mechanism and pin carriage control for such a machine.

With these and incidental objects in view, the invention includes certain novel features of construction and combinations of parts, a preferred form or embodiment of which is hereinafter described with reference to the drawings which accompany and form a part of this specification.

*Brief description of the basic machine*

A brief description of the basic machine will be given to show how the novel keyboard mechanism for initiating a machine operation cooperates with the standard differential mechanism, motor bars, and control keys.

Figure 9:
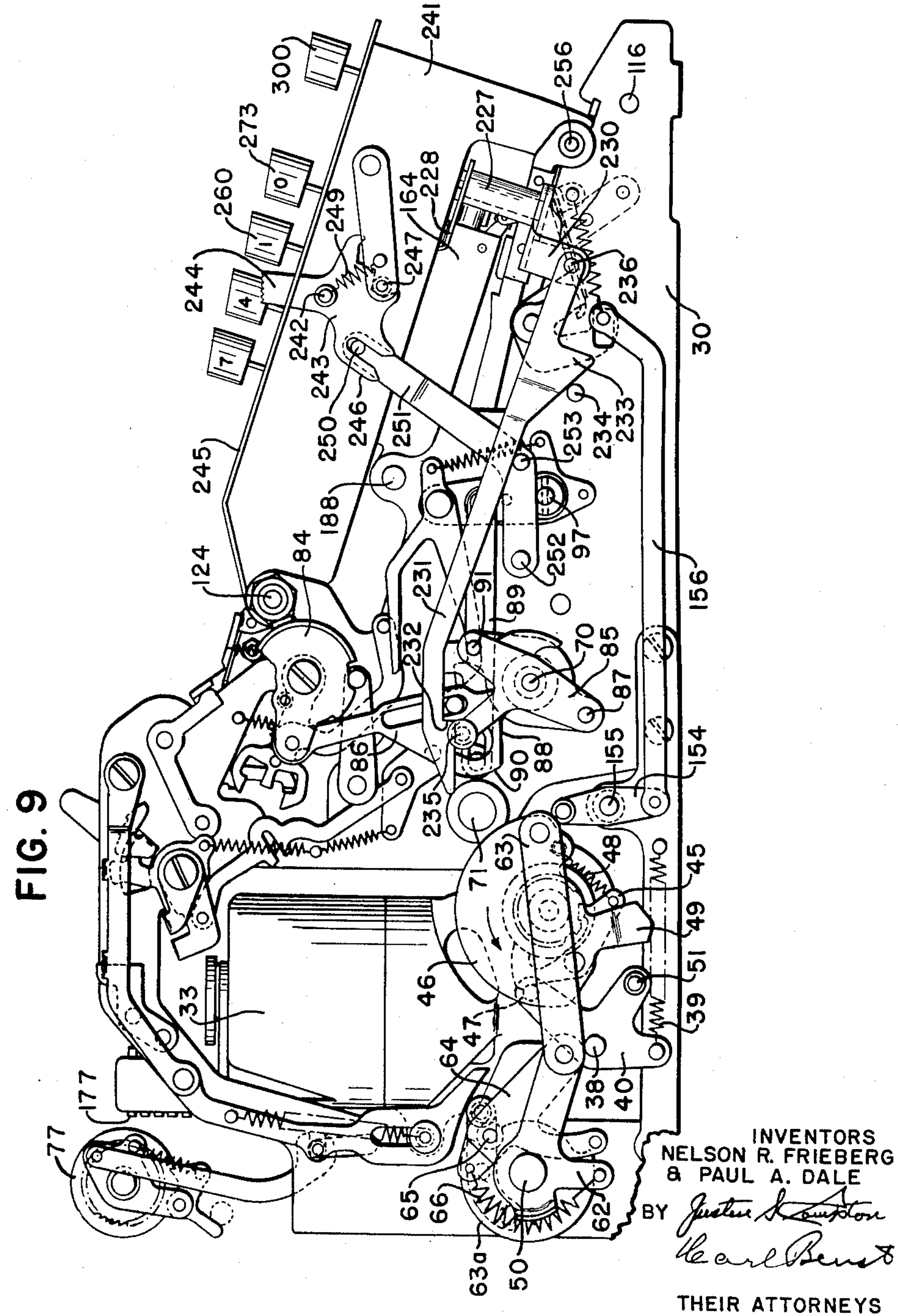
Fig. 9 is a view of the left side of the machine with the case removed.
Figure 10:
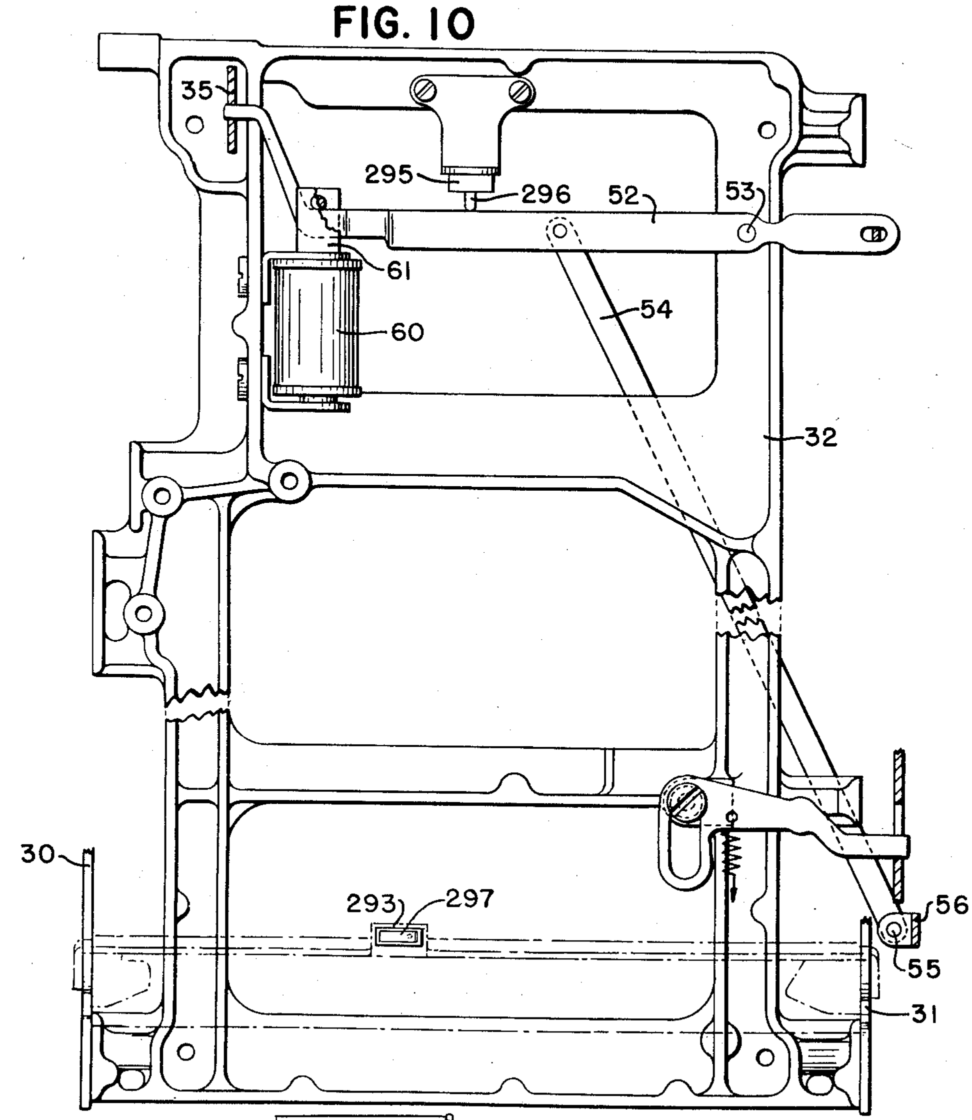
Fig. 10 is a top plan view of the base of the machine, showing the manual and electrical machine trip linkage.
Figure 11:
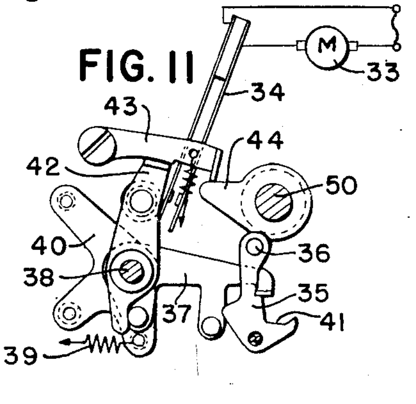
Fig. 11 is a detail of the machine trip latch mechanism as viewed from the right.

The machine frame includes a base 32 (Fig. 10), a right side frame plate 31, and a left side frame plate 30 (see Figs. 3, 5, 7, and 9), joined together so as to act as a support for the various machine elements. Referring to Fig. 9, the machine is driven by a motor 33, energized upon the closing of motor switch 34 (Fig. 11) when trip latch 35 is rocked clockwise on its frame-supported pivot 36, which allows trip lever 37, secured to shaft 38, to rock clockwise, the shaft 38 turning in response to the urge of spring 39 (see also Fig. 9) attached to three-armed lever 40, secured to shaft 38. As lever 37 (Fig. 11) rocks until an ear thereon rests on surface 41 of the trip latch 35, lever 42, secured to shaft 38, is rocked clockwise, closing the switch 34, thus starting the motor. Lever 42 is caught by a latch 43 as the machine starts, holding the motor switch closed until cam 44, mounted on the main drive shaft 50, strikes latch 43 at the close of a machine cycle. Shaft 50, in a machine operation, rocks counter-clockwise, from the position shown, and back, by means next to be described. The motor, through reduction gearing, turns a shaft to which is secured a notched wheel which cooperates with a pawl 45 (Fig. 9) pivoted on front crank plate 46, which in effective position couples the notched wheel to said front crank plate 46. When three-armed lever 40 is in the home position while the machine is at rest, stud 47 thereon holds the pawl 45 in ineffective position, where crank plate 46 is uncoupled from the motor. As the machine is tripped, the lever 40 rocks counter-clockwise, as seen in Fig. 9, allowing pawl 45 to move to effective position under the influence of spring 48, and, as the motor starts, crank plate 46 starts rotating counter-clockwise, in the direction of the arrow. As crank plate 46 has nearly completed its first turn, a cam arm 49 thereon strikes stud 51 on lever 40, rocking said lever clockwise to put stud 47 in position to strike pawl 45, disengaging crank plate 46 from the motor, and rocking shaft 38 to home position, allowing trip lever 37 (Fig. 11) to be relatched by trip latch 35. Trip latch 35 (Fig. 10) has inserted therein the left end of a lever 52, pivoted to the machine base at 53. Pivoted to lever 52 is a link 54, forward movement of which link trips the machine. The forward end of link 54 is pivoted at 55 to the lower extending arm 56 (see Fig. 3) of a multiple-armed lever 57, pivoted to the right side frame plate at 57*a*, which is rocked clockwise, from the position shown, by the control members to be described, to set the machine in operation. Spring 58 holds lever 57 in home position, where it is stopped by an ear 59 striking the right side frame plate 31. Whenever the machine is tripped, it is against the action of spring 58, which constantly urges the latch 35 (Fig. 11) to latching position. Lever 52 (Fig. 10) also may be rocked by the action of solenoid 60, having a core 61 with a bifurcated end which embraces the left end of said lever 52. Energization of the solenoid, therefore, will trip the machine, and its energization may be brought about by the above-mentioned employment of the digit keys.

Returning to Fig. 9, the front crank plate is coupled to a rear crank plate 62 by a link 63. Crank plate 62 is loosely mounted on main drive shaft 50, journaled in the side frame plates 30 and 31, but is coupled to a plate 63a, secured to shaft 50, through link 64, pivoted to the forwardly-extending arm of plate 62. Link 64 has a stud 65, held in a notch in plate 63a by spring 66, so that this coupling will yield on an overload, if a machine operation is impeded in any way, to prevent breakage of the parts.

To the right end of the main drive shaft 50 (Fig. 3) is secured a plate 67, coupled by a link 68 to a plate 69, secured to a secondary drive shaft 70, extending between and journaled in the side frame plates 30 and 31. As shaft 50 and plate 67 rock first counter-clockwise and then clockwise during a machine operation, so do plate 69 and shaft 70.

Figure 1:
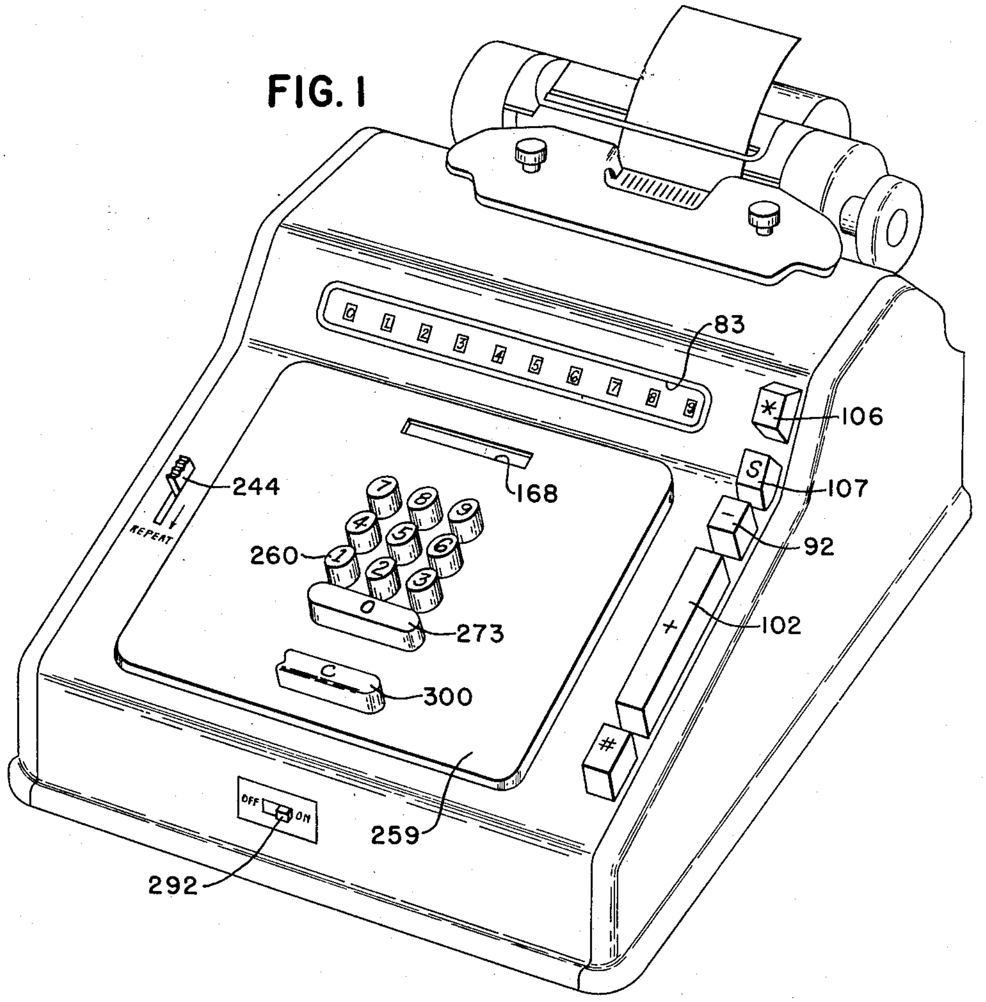
Fig. 1 is a perspective view of the machine.

The differential mechanism is the same for each denominational order except for the difference in bends required in the diverging levers, to be described, which couple the totalizer to the stop bars and to the printer bars. A typical denominational order of the differential mechanism will be described in connection with Fig. 7, to which attention is directed. A cross rod 71, mounted in the side frame plates 30 and 31, has rotatably mounted thereon at intervals, across the width of the machine, a series of diverging levers, like the three-armed diverging lever 72, having a rearwardly-extending arm 139a pivotally coupled to an associated printer bar 73 by an adjusting link 74, an upwardly-extending arm 139, having mounted thereon by pin-and-slot coupling a rack 75, and a forwardly-extending arm 139b, having secured thereto an alining rack 76. The printer mechanism, though shown, will not be explained in detail, as it forms no part of the novel mechanism and is fully described in the Fowler et al. application to which reference has been made. It is sufficient to note that the rotative positions of the diverging levers represent amounts and that they are controlled by the pin carriage in entry operations or by the totalizer pinions in total-taking operations to represent digital data. Each printer bar is moved to set the type representing the proper amount opposite a paper-holding platen, represented diagrammatically at 77, and the type so positioned is struck by an associated hammer 78 at mid-cycle in a machine operation. An alining bail 79 is moved near mid-cycle by cam 80 to enter the alining racks 76 to hold the diverging levers in accurately-determined position. The totalizer consists of a main pinion 81 for each denominational order, and attached to each is a number drum bearing the digits of the denominational order on its periphery. The machine shown is a decimal machine, and the drums are viewed through a viewing aperture 83 (see Fig. 1) in the case. The side-spacing of the totalizer pinions across the machine is represented in Fig. 1 by the spacing of the number drums. Associated with each main totalizer pinion 81 is an idler pinion 82 (Fig. 7) in mesh therewith and having an extra set of teeth side-spaced from those in mesh with the associated main pinion. In adding operations, the main pinions engage the racks 75 in item-entering timing. In subtract operations, the totalizer is shifted sidewise to bring the extra teeth of the idler pinions in line with the racks which are engaged therewith in item-entering timing. The totalizer-shifting cam 84 (Fig. 9) is rocked one way or another, by movement of plate 85, which rocks each machine cycle, according to the disposition of lever 86. Lever 86, shown in the "up" position, if down, is pushed up by stud 87 striking surface 88, provided lever 86 is pushed rearwardly by link 89, so that stud 87 will not pass around the arcuate surface 90. If lever 86 is up, stud 91 strikes a surface of lever 86 to pull it down if lever 86 is pulled forward by link 89. Link 89 is pulled forward on subtract operations under control of key 92 (Fig. 1), which has a formation that strikes a stud 93 (Fig. 3) on subtract control plate 94, rocking it clockwise, so that a stud 95 on a rearwardly-extending arm thereof causes lever 96 to rock counter-clockwise, turning its supporting shaft 97 in the same direction. Shaft 97 extends across the machine and, as seen in Fig. 9, is turned clockwise as the subtract key is depressed, drawing link 89, so that stud 91 will pull down lever 86, if not already down, and rock cam 84 counter-clockwise to shift the totalizer to bring the idler pinions into mesh with the associated racks at the beginning of a machine cycle. If the next operation is an add operation, the cam 84 will shift the totalizer back to add position. All of this is described in detail in the Fowler et al. application before mentioned. The only connection which the subtract mechanism has with the novel mechanism is that it must be used in subtract operations to condition the machine for subtraction as well as to initiate a machine cycle, such machine cycle initiation not being effected during subtract operations by the digit keys.

Figure 3:
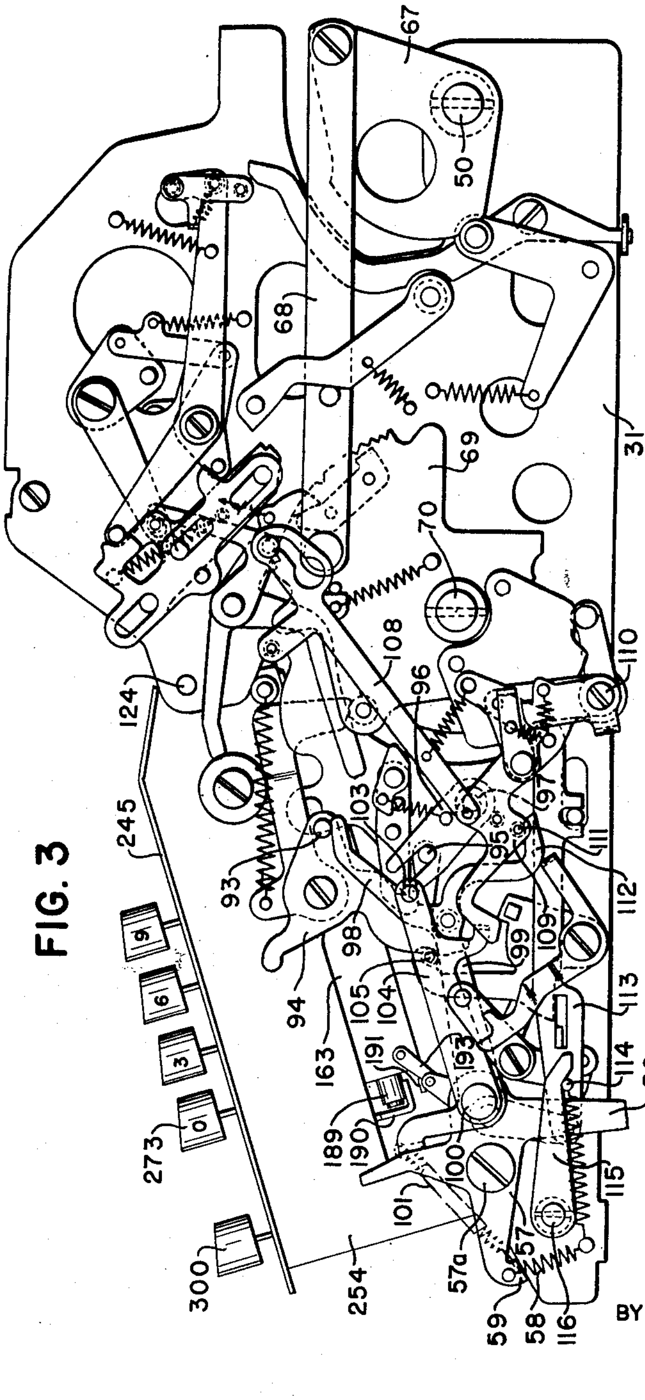
Fig. 3 is a view of the right side of the machine with the case removed.
Figure 4:
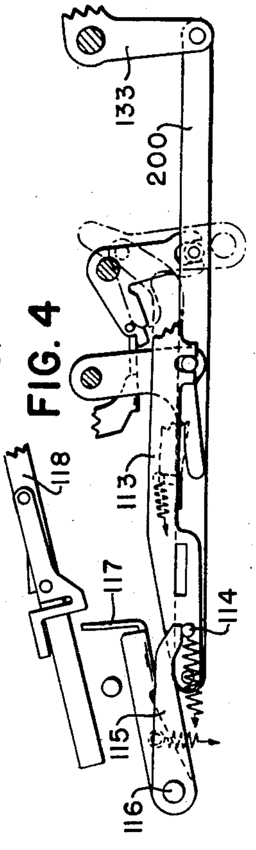
Fig. 4 is a view of part of the total-taking control mechanism.

Referring to Fig. 3, stud 93, when the subtract key is depressed, bears down on the upwardly- and rearwardly-extending arm 98 of a lever 99, pivoted at 100 to lever 57. Lever 99 has a yielding coupling to lever 57 through a spring 101, extending between an upwardly-extending arm of lever 99 and the forwardly-extending arm of lever 57. Consequently, lever 57 is rocked by the subtract key, thus initiating a machine operation as well as conditioning the totalizer-shifting cam mechanism to shift the totalizer to subtract position in the ensuing machine cycle. After a subtract operation, the lever 96 returns to normal position, and the cam 84 (Fig. 9) will be turned to add position at the beginning of the next machine operation.

Adding operations may be initiated by depression of motor bar 102 (Fig. 1), which has a key stem formation which bears down on stud 103 (Fig. 3) on a lever 104, pivoted at 100 to lever 57. Lever 104 has a stud 105, which, by bearing down on lever 99, through spring 101, rocks lever 57 to initiate a cycle of machine operation.

Figure 7:
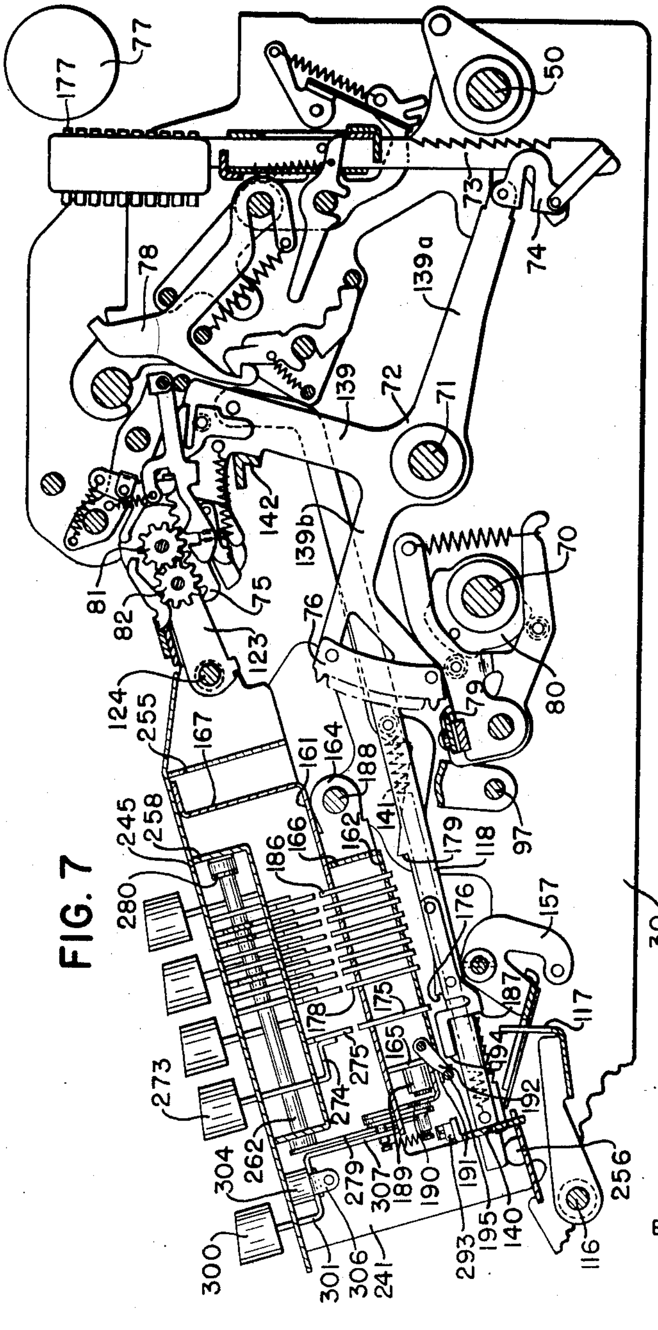
Fig. 7 is a section through the machine to the right of the keys and the pin carriage, showing a denominational bank of the differential in relation thereto.
Figure 18:
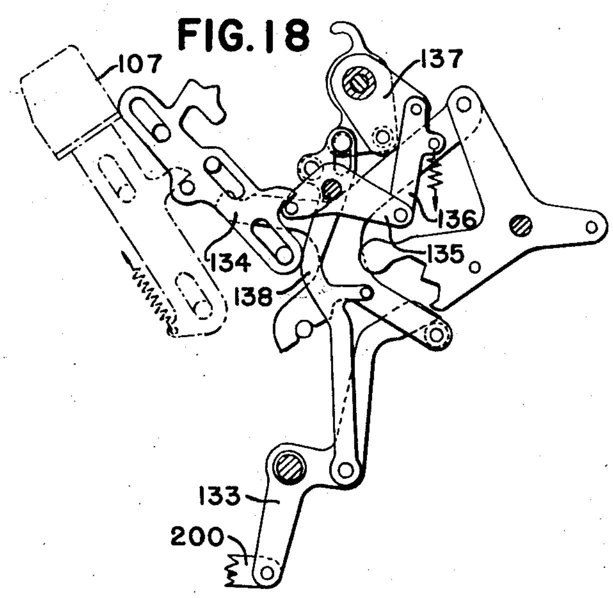
Fig. 18 is a detail of the sub-total-taking control mechanism.

On total-taking operations, the total key 106 (Figs. 1 and 15) is depressed to set the machine in operation for two cycles, in which a total is taken and printed, and on sub-total-taking operations the sub-total key 107 (Figs. 1 and 18) is depressed to initiate a two-cycle operation, in which a sub-total is taken and printed. Depression of either key 106 or 107 causes a link 108 (Figs. 3 and 15) to move downwardly and forwardly, so that a total control plate 109 is rocked counter-clockwise around its pivot 110, stud 111 thereon bearing down on arm 112 of lever 99, setting the machine into operation. As a total-taking operation commences, the link 113 is drawn rearwardly, and stud 114 (see especially Fig. 3) rocks lever 115, fast on shaft 116, counter-clockwise. Secured to shaft 116 (Fig. 7) is a bail 117, which is thereby rocked on the first cycle of a total- or sub-total-taking operation to hold the stop bars from moving during the first cycle of a total-taking operation. A typical stop bar 118, of which there is one for each denominational order, is shown in Fig. 7, and they will be described later.

*Totalizer-engaging mechanism*

Figure 17:
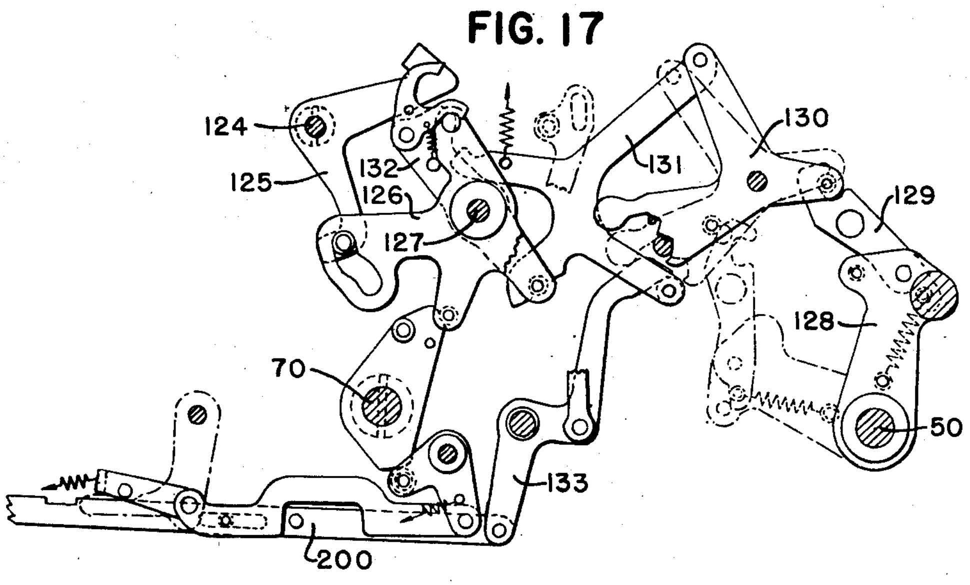
Fig. 17 is a detail of the total-taking control mechanism.

The totalizer pinions are supported in a framework which is rockable away from the racks for disengaging the totalizer and toward the racks for engaging the totalizer. The framework arms, one of which, 123, is shown in Fig. 7, are secured on shaft 124, which is rockable by bell crank lever 125 (Fig. 17), actuatable by a cam slot in a plate 126, pivoted at 127 to the right side plate. In item-entering operations, the totalizer, normally in engagement with the racks, is first disengaged at the commencement of a machine operation as main drive shaft 50 rocks counter-clockwise, and then is re-engaged as shaft 50 reaches its mid-cycle position. Shaft 50 actuates cam 126 through lever 128, hook lever 129, three-armed lever 130, pitman 131, and hook lever 132. In total-taking operations, a bell crank lever 133 is rocked counter-clockwise to control the engagement of pitman 131 with hook lever 132 in a different manner in the second cycle, so that the totalizer remains in engagement during the first half of the second machine cycle, disengages therefrom at mid-cycle, and re-engages at the close of the second cycle. In sub-total operations, under control of key 107 (Fig. 18), members 134, 135, 136, and 138 are moved to prevent disengagement of the totalizer during the second cycle of a two-cycle total operation, thus resulting in a sub-total operation. All of this total-taking, sub-total-taking, and item-entering totalizer-engaging mechanism is described in full in the aforementioned Fowler et al. application.

*Stop bar mechanism*

To the upper extending arm 139 (Fig. 7) of each diverging lever 72 is pivoted its associated stop bar 118. The front end of each stop bar is supported for sliding movement in an associated slot in a support comb 140. Each stop bar is urged forwardly by a spring 141, extended between the stop bar and the comb, but such movement is prevented when the machine is at rest by a bail 142, extending in front of all the upper extending arms 139 of the diverging levers. Bail 142 is supported by two arms, one of which, 143 (Fig. 5), is shown pinned to cross rod 71. Pivoted to the bottom of arm 143 is a pitman 144, having a roller 145 in engagement with a cam 146, pinned on drive shaft 50, on which the bifurcated rear end of pitman 144 rides. In the home position, shown, pitman 144, arm 143, and bail 142 (Fig. 7) hold the stop bars from movement. As a machine cycle starts, the bail 142 rocks forwardly and downwardly, and the stop bars will move with it unless otherwise prevented individually by the pins in the pin carriage, to be described, or as a group by bail 117 in the first cycle of a total-taking or sub-total-taking operation, or as controlled by the totalizer wheels in the second cycle of a total-taking or sub-total-taking operation, all of such controlled movements being well known in the art to which reference has been made.

Figure 6:
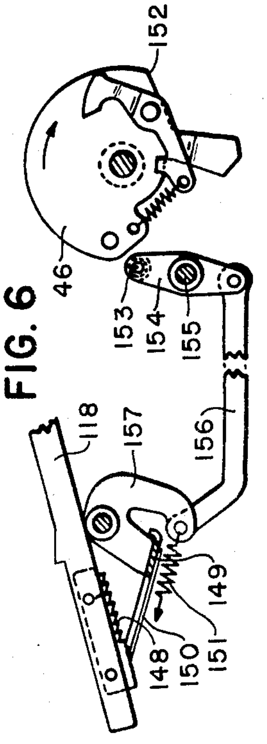
Fig. 6 is a view of the stop bar anti-rebound mechanism.

Referring to Fig. 6, as the stop bars move forward rapidly, they are likely to rebound slightly as they are halted by the pins, due to the resiliency of the parts. To prevent misoperation, each stop bar is provided on the under side with backwardly-pointed teeth 148. A bail 149, running across the machine under the stop bars, has a blade 150 associated with each stop bar, which blades are normally held against the teeth by spring 151, so that the teeth "click" thereover on the forward movement of the stop bars, preventing backward movement thereof. This bail 149 is withdrawn at mid-cycle through the movement of front crank plate 46 as high point 152 comes against stud 153 on lever 154, pivoted to the left side frame at 155, moving the lever so as to draw link 156, pivoted thereto, rearwardly to rock bail support arm 157 counter-clockwise to withdraw the blades 150 from the teeth 148. The stop bars, therefore, are permitted to return home during the second half of a machine cycle. At the close of the machine cycle, the blades resume their effective position, as crank plate 46 then presents a low surface with respect to stud 153.

*The pin carriage*

Figure 12:
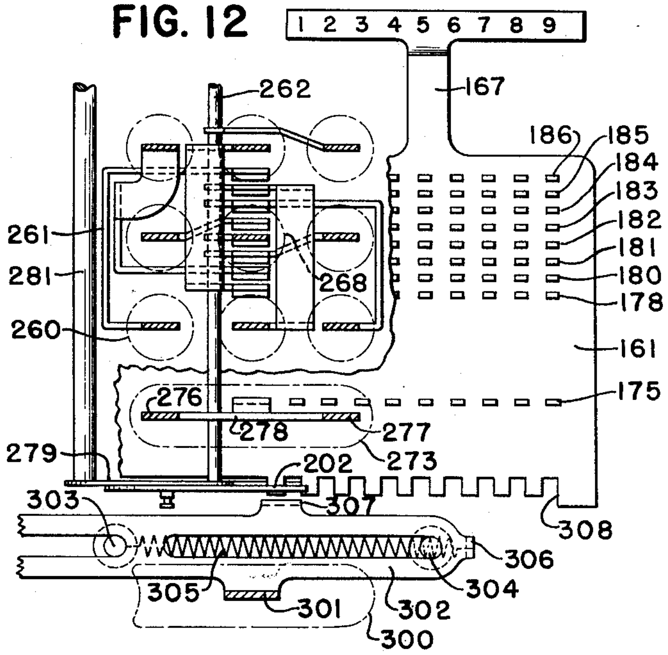
Fig. 12 is a top plan view of the pin carriage, showing the key stems and the pin carriage indexing mechanism, parts being broken away and others sectioned.

For controlling the movement of the stop bars in item entries according to the value of the digits to be entered, there is provided a pin carriage having a top plate 161 (Figs. 2, 7, 12, 14, 16, and 20), a bottom plate 162 (Figs. 2, 7, 14 and 16), a right side plate 163 (Figs. 2, 3, and 5), a left side plate 164 (Figs. 2, 7, 9, 20, and 21), a front end plate 165 (Fig. 7), and a rear end plate 166 (Figs. 2, 7, and 14), secured together in box-like construction, the top plate at the rear having an upward and rearward extension 167 (Figs. 7 and 12), on which are denomination indicator numbers "1" to "9" (as seen in Fig. 12), which show through an indicating aperture 168 (Fig. 1) to give the operator an indication of the pin carriage position as it is indexed denomination by denomination.

The top and bottom plates 161 and 162 of the pin carriage have nine rows of alined slots, in which are mounted slidable pins, each having an ineffective "up" position and an effective "down" position, in which they control the stop bars with which they are alined in a machine operation.

Figures 14, 15:
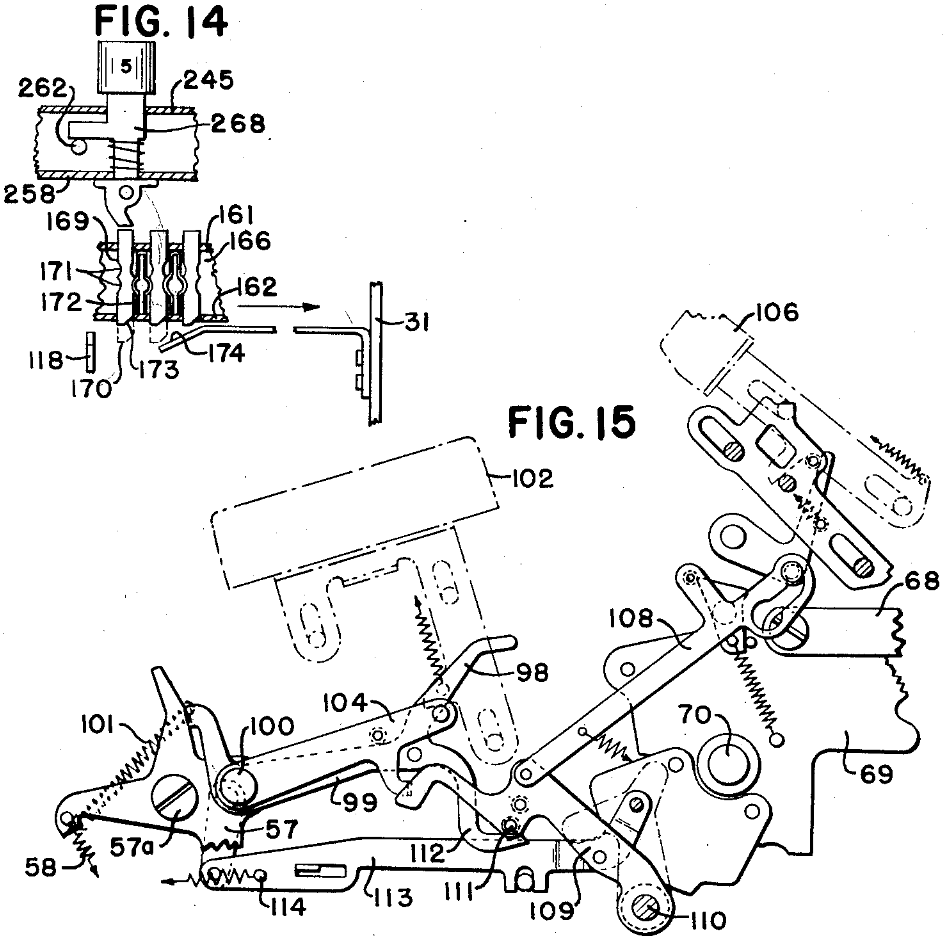
Fig. 14 is a detail showing a key in relation to the pin carriage and the key-restoring cam.
Fig. 15 shows the motor bar and total key machine tripping mechanism.
Figure 16:
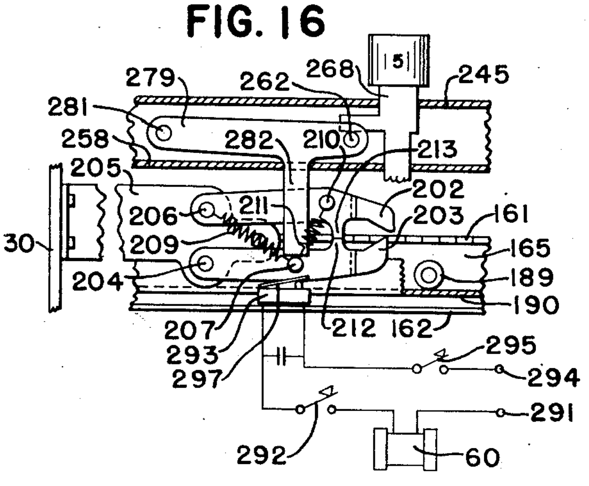
Fig. 16 is a detail of the pin carriage indexing mechanism and the digit-key-operated switch for energizing the solenoid for tripping the machine by the digit keys, and includes the associated electric circuit.

Referring to Fig. 14, the pin 169 is shown in its ineffective or "up" position, and the dotted line 170 shows its foot in the effective or "down" position. Each pin has on its sides detent formations 171, by which it is held resiliently in "up" or "down" position by cooperating springs, like spring 172, positioned between the top and bottom plates. In the "down" position, the top of a pin is slightly elevated above plate 161. The bottom of each pin is chamfered, as shown at 173, so that, upon movement of the pin carriage to the right to home position in the last half of a machine cycle, as will be explained, the keys in "down" position will be restored to "up" position by striking restoring cam plate surface 174 as the pin carriage moves home in the direction of the arrow.

Referring to Fig. 12, there are nine pins in each row. Taking the right-most row as an example, pin 175 controls the movement of the stop bar to represent a zero. This pin 175, shown in Fig. 7, cooperates with stop formation 176 to limit the movement of diverging lever 72 to one step to position the "zero" type 177 to printing position. This one step of movement will not enter a digit in the totalizer on return of the stop bar by bail 142 to home position, as the rack 75 is coupled to arm 139 of diverging lever 72 by a pin-and-slot connection which allows this one step of movement before any digit-entering movement of the rack occurs with respect to the totalizer. Referring to Figs. 7 and 12, pin 178, in "effective" position, cooperates with stop formation 179 to enter the digit "8," and pins 180 to 186 (Fig. 12) cooperate with stop formation 179 to enter, respectively, the digits "7," "6," "5," "4," "3," "2," and "1." The entry of the digit "9" is not controlled by a pin but by the "9" key rendering the escapement effective to index the pin carriage one row (in addition to initiating a machine operation if desired), which carries with it the zero stop member 191, to be described, uncovering one of the stop bars, which may move, during the next machine operation, its full distance; that is, until surface 187 (Fig. 7) strikes the comb 140.

The pin carriage is slidably mounted on shaft 188 for movement crosswise of the stop bars, a roller 189, running in a raceway 190, secured between the side frame plates, supporting its front end.

Figure 2:
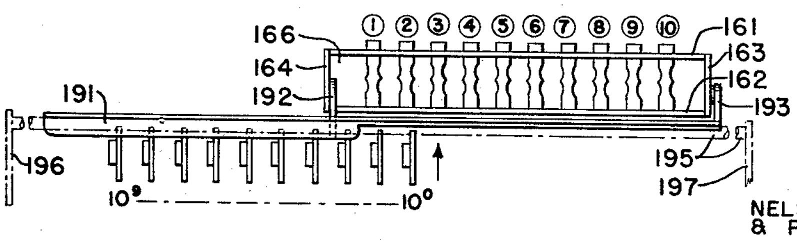
Fig. 2 is a diagrammatic representation of the front elevation of the pin carriage in relation to the stop bars.

Referring to Fig. 2, there are shown the front ends of the stop bars representing the powers of ten, $10^0$ to $10^9$, respectively, beginning at the right and working left, in their relation to the rows of pins in the pin carriage after two steps of movement from its right-hand position. It will be seen that the first row of pins is in alinement with the $10^1$ stop bar and that the second row of pins is in alinement with the $10^0$ stop bar, the pin rows being indicated with circled Arabic numerals. If no digits had been set up—that is to say, with the pin carriage in normal position—the first row of pins would be in line with the arrow.

The zero stop member 191, in the form of a bail, is supported on arms 192 and 193, pivoted to the left and right side plates 164 and 163 of the pin carriage (see also Fig. 3). The zero stop member is to the left of the front row of pins and is wide enough so that, when the pin carriage is in home position—that is, to the right-hand position—it is in front of all the stop bars. In such position, on operation of the machine, the stop surface 194 (see Fig. 7) of all the stop bars will strike the bail after the one step of movement that brings the diverging levers 72 and the printer bars 73 to their zero position. As digits are set into the pin carriage by the keys, the pin carriage is indexed to the left one step at a time, so that the stop bars are uncovered one at a time seriatim.

Figure 5:
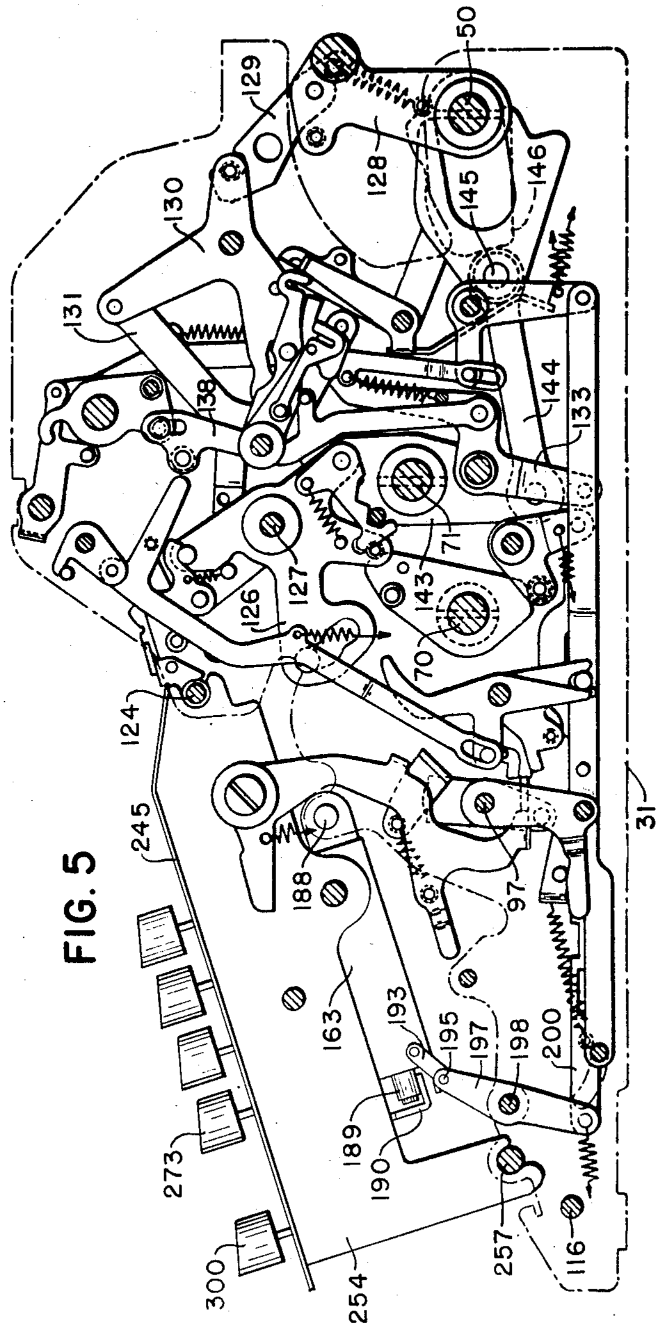
Fig. 5 is a view of the right side mechanism inside the right side frame, showing particularly the totalizer-engaging mechanism and the total-taking control mechanism.

As the zero stop member must be rendered ineffective during the second cycle of the two-cycle operations of total taking or sub-total taking in order that the stop bars and associated mechanism may move under control of the totalizer pinions, the said zero stop member is supported on a rod 195 (Figs. 2 and 7) held in arms 196 and 197 mounted on studs journaled in the side frame plates 30 and 31, the right stud, 198, being shown in Fig. 5. The lower end of arm 197 is pivoted to link 200, which is drawn to the rear on the second half of the first cycle of two-cycle operations, as explained in the beforementioned Fowler et al. application. This lifts the zero stop member sufficiently to render it ineffective during the second cycle of such two-cycle operations. Link 200 is restored at the conclusion of such two-cycle operations.

A spring 201 (Fig. 20) always urges the pin carriage toward the left, but any leftward movement is controlled by an escapement mechanism including pawls 202 and 203 (Fig. 16), which cooperate with the notched front edge of the upper plate 161 of the pin carriage. The notching is best seen in Fig. 12.

Figures 19, 20, 21:
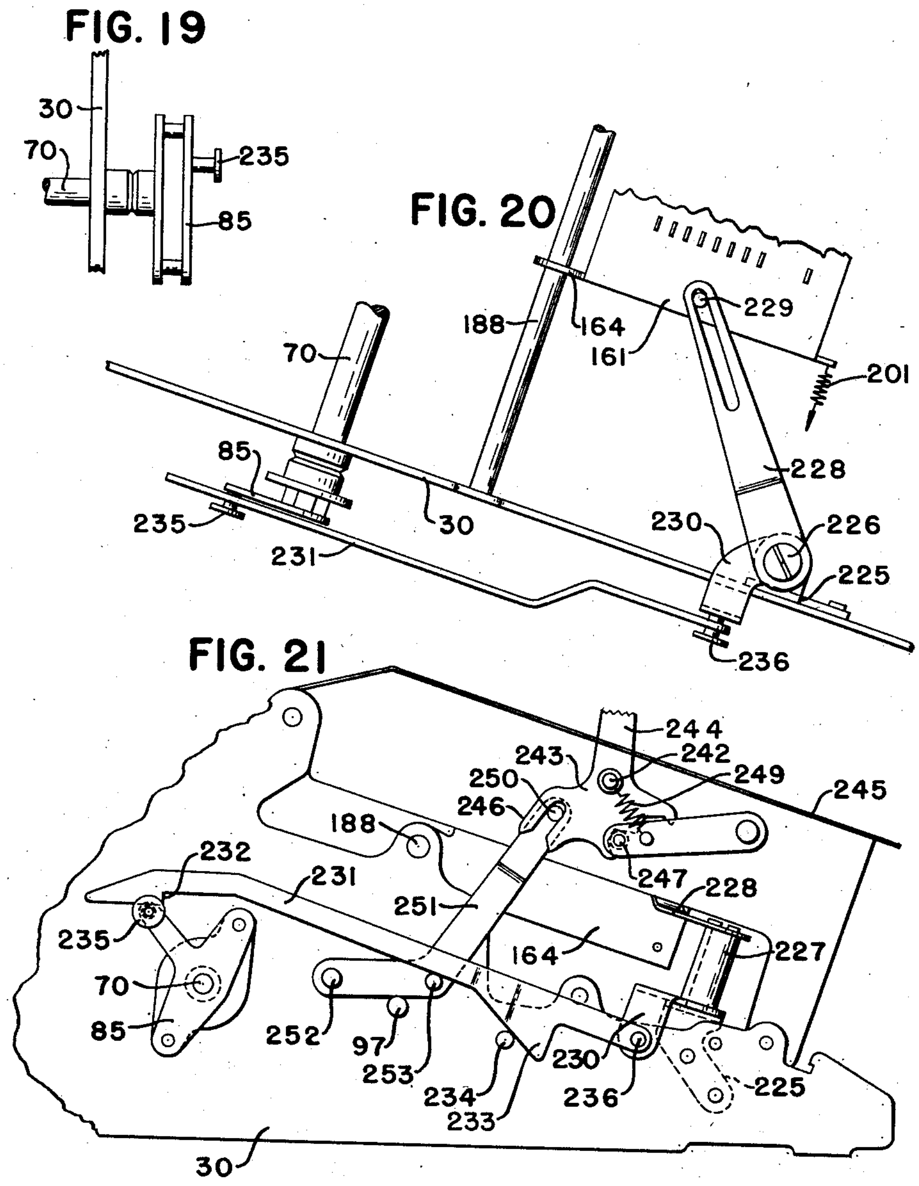
Fig. 19 is a detail of the pin carriage restoring drive plate.
Fig. 20 is a plan view of the pin carriage restoring linkage.
Fig. 21 is a view in elevation of the substance of Fig. 20.

Returning to Fig. 16, pawl 203 is pivoted at 204 to bracket 205, secured to left side plate 30, and pawl 202 is pivoted to the same bracket at 206. Pawl 203 is provided with a stud 207. Extending between pivot 206 and stud 207 is a spring 209, which urges pawl 203 counter-clockwise, so that its nose enters that one of the notches in plate 161 that is in alinement with it, the right end of the nose engaging the right side of the notch due to the pull of spring 201 (Fig. 20). Pawl 202 is provided with a stud 210, and a spring 211 extends between it and stud 207, holding the nose on the right end of pawl 202 in engagement with the top surface of that tooth next toward the right from the notch with which pawl 203 is engaged. If pawl 203 is rocked slightly clockwise from the position shown, its nose will escape from the notch which it engages, and the next notch will be engaged by the nose of pawl 202, which is very slightly to the right of the nose of pawl 203. The resulting movement of the pin carriage is sufficient to cause the pins of the first row to come into alinement with the next stop bar to the left. This alinement is not destroyed if pawl 203 is allowed to return to said next notch, which knocks pawl 202 out of the notch, because the nose of pawl 202 is only very slightly offset from the nose of pawl 203. The pawl 202 is rocked out of said next notch by formation 212 on pawl 203 striking formation 213 on pawl 202. Each time pawl 203 is rocked clockwise, the pin carriage is moved one step to the left by its spring 201. Each time pawl 203 is rocked clockwise beyond the point necessary to index the pin carriage, its stud 207 will close a normally-open micro-switch 293 to initiate a cycle of machine operation, as will be described. During the last half of a machine operation, the pin carriage is returned to home position by the main operating means, as will next be described.

Referring to Fig. 20, secured to the left side plate 30 is a bracket 225, supporting a stud 226, on which is mounted a collar 227 (see Fig. 21), having secured to its upper end a slotted lever 228, embracing a stud 229 secured to the left side of upper plate 161 of the pin carriage. Collar 227 has secured to its lower end a bent-over lever 230, pivoted at 236 to a hook member 231, extending rearwardly. Hook member 231 has on its outer end a hook 232 and has in its mid-portion a cam formation 233. With the machine at rest after a machine cycle, the parts are as shown in Figs. 20 and 21. As the pin carriage moves to the left side of the machine, hook member 231 is drawn forward. The cam formation 233, resting on stud 234, normally keeps hook formation 232 from engaging stud 235 on plate 85, but, as hook member 231 is drawn forward, it is free to swing slightly counter-clockwise on its pivot 236, so that, as plate 85 rocks clockwise on the first half of a machine cycle, stud 235 gets behind hook formation 232, and, on the last half of the cycle, member 231 is drawn rearwardly, returning the pin carriage to normal position, to the right. Hook member 231 disengages stud 235 as cam 233 rides up on stud 234.

*Repeat mechanism*

Referring to Figs. 9 and 21, there is provided on the left side plate 241 of the key bank unit, to be described, a stud 242, on which is pivoted a "Repeat" lever 243, having a finger-piece 244, extending through a slot in the top plate 245 of the key bank unit and through a slot in the machine casing (see Fig. 1), a bifurcated rearwardly-extending arm 246, and a two-notched lower surface on which plays a stud 247 on a lever 248 pivoted to plate 241, said stud being held in contact with lever 243 by a spring 249. Bifurcated arm 246 embraces a stud 250 on the end of a bell crank lever 251 pivoted at 252 on a stud in the left side plate 30. Lever 251 has a stud 253 adapted to bear against the under side of hook member 231. Stud 253 will not interfere with the coupling of stud 235 and hook formation 232 when member 231 is drawn forwardly, but, if "Repeat" lever 243 is rocked clockwise to effective position, then stud 253 will be lifted to rock hook member 231 upwardly, so that the pin carriage will not be returned in the last half of a machine cycle. Under the latter circumstances, the pin carriage remains effective in the next machine cycle to repeat the entry set thereon unless such entry is changed by additional use of the digit keys.

*The key bank unit*

Referring to Figs. 3, 5, 7, and 9, the key bank unit includes the beforementioned top plate 245 and left side plate 241, and includes a right side plate 254 and an interior cross piece 255, joined into a box-like unit which is supported at its rear end on shaft 124 and at its front end on a stud 256 on the left side plate and a stud 257 on the right side plate. Secured to the under side of top plate 245 of the keyboard unit is a U-shaped pan 258 (Fig. 7).

Figure 8:
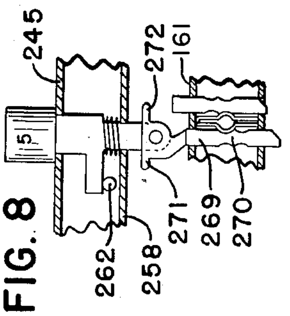
Fig. 8 is a detail showing a key in operated condition before the indexing movement of the pin carriage.
Figure 13:
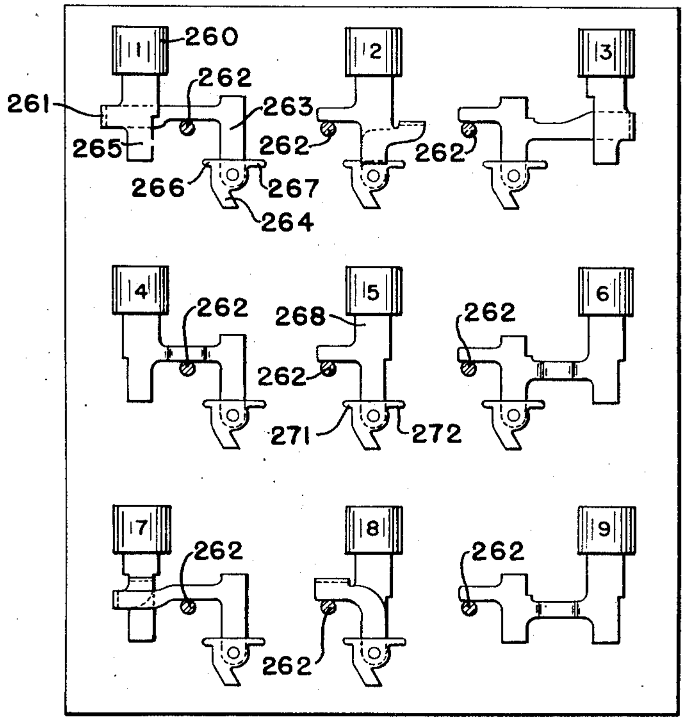
Fig. 13 is a view showing, in front elevation, the nine significant digit keys.

The digit keys "1," "2," "3," "4," "5," "6," "7," "8," "9," and "0" have the key tips arranged as shown in Fig. 1, where they protrude through a dust cover plate 259. The upper portion of each of the key stems on which the key tips are mounted extends through an associated slot in plate 245 (Fig. 7), the mid-portion of each key stem being bent so that a depending leg thereof passes through an associated one of alined holes in the pan 258, said alined holes extending in a row lengthwise of the key bank unit and forming the pin-setting station past which the pin carriage is indexed row by row. Each key also has a portion adapted to contact a universal bar 262 (see Fig. 12 also) common to all the digit keys. In Fig. 12 there are shown, in phantom, all of the digit key tips, and there are shown, in section and in full line, the various bends and conformations of the key stems as seen in top plan view. For instance, the "1" key 260 has a key stem 261, the middle portion of which is formed to pass first to the left, thence toward the back of the machine, thence to the right, where it crosses the universal bar 262, and finally downward to form a depending portion 263 (see Fig. 13), having pivoted thereon an interponent in the form of a by-pass pawl 264, which is directly over the "1" position of the pin carriage setting station. Each key except the "5" key, again taking the "1" key as an example, has a guide stem 265 directly under the key tip, around which a return spring is wound, which guide stem enters an associated guide slot in the pan 258. The "5" key 268 needs no separate guide stem, as it is directly over the "5" position of the pin carriage setting station. The by-pass pawl of each key is under the pan 258, and each pawl has a left shoulder 266 (referring to the "1" key in Fig. 13 as an example) and a right shoulder 267, these shoulders, when a key is in the "up" position, resting against the bottom of the pan, preventing the pawl from swinging (see Fig. 14). When a key, taking the "5" key as an example, is depressed, as seen in Fig. 8, the bottom 269 of the pawl, moving downwardly, is on dead center and will not yield until it makes contact with and depresses the associated "5" pin that is in alinement therewith. Its shoulders 271 and 272 move out of contact with the bottom of pan 258 so that the pawl may swing clockwise or counter-clockwise. Inasmuch as the pin carriage, as has been described, moves to the left as a key is depressed to bring the depressed pin into operative position, the next row of pins comes into pin-setting position. This movement is not interfered with by the depressed key, as its pawl will swing clockwise. Where, as with this machine, the machine operation always commences on the down stroke of a digit key, if so used, it is necessary that the pin carriage immediately index before commencement of the operation, and this swinging pawl construction allows the next row of unset pins to come into the setting station without interference. As the pin carriage indexes after the key is depressed to the indexing stage, the associated pawl rides off the depressed pin, the distance from the end of the pawl to plate 161 allowing movement of the key to the second stage for initiating a machine operation. The swinging pawl allows the next pin to come to the pin-seting station without interference. As the depressed key is raised after the machine operation commences, the pawl is forced back to normal position as its shoulders strike the under side of pan 258. All of the digit keys except the "9" key are constructed with such a swinging pawl. The "9" key only indexes the pin carriage and needs no pin-setting pawl. The pawl of any key provided therewith swings the other way—that is to say, clockwise—if the key is held down until the end of a machine cycle and thus is struck by one or more pins in "up" position in the returning pin carriage. The "0" key has a stem 274, formed as seen in Fig. 7, to cooperate with the "0" pins in the pin carriage. The stem 274 has a swinging pawl 275 like the other digit keys. As seen in Fig. 1, the "0" key tip is wider than the others, and, as seen in Fig. 12, the "0" key stem has two fingers 276 and 277, entering the key tip, and a bridge 278, which is under the top plate 245, said bridge extending over the universal bar 262.

The universal bar 262 (Fig. 16) is supported by a front arm 279 and a rear arm 280 (Fig. 7) secured on a pivot rod 281 (Fig. 16) journaled in the front and rear ends of pan 258. Arm 279 has a depending leg 282, as mentioned, the lower end of which bears on stud 207. As any one of the digit keys is depressed, pawl 203 is rocked, which indexes the pin carriage, as has been described.

*Initiation of machine operation by digit keys*

As before stated, energization of solenoid 60 (Fig. 10) will initiate a cycle of machine operation. This solenoid is shown diagrammatically in Fig. 16 in a circuit including electric supply terminal 291, main switch 292, which may be placed in any convenient and accessible place on the machine case, as shown placed in Fig. 1, normally open micro-switch 293, a normally closed micro-switch 295 (see Fig. 10 also), and supply terminal 294. If the main switch 292 and the digit-key-operated switch 293 are closed, the solenoid 60 thereupon will be energized and the machine tripped. As seen in Fig. 7, switch 293 is mounted on comb 140. Switch 295 (Fig. 10) is mounted on a frame-supported member with its button 296 normally pushed in by lever 52, so that the switch is closed. As soon as the machine is tripped and lever 52 is rocked counter-clockwise, switch 295 opens, breaking the solenoid circuit so that the machine may relatch at the end of the machine cycle. If, on the relatching movement of lever 52 as switch 295 closes, the switch 293 remains closed due to continued depression of a digit key, the machine will be tripped again. That is to say, as long as a digit key is held down to its machine release position, the machine will continue cyclic operation. If the "Repeat" lever is in "repeat" position, the data set up in the pin carriage will be repeatedly entered. If the "Repeat" lever is in ineffective position, the second cycle and following cycles will be idle. If it is desired to operate the machine by the add motor bar 102, the switch 292 may be opened. It should be noted, with reference to Fig. 16, that pawl 203 can be moved to pin carriage indexing position before the stud 207 makes contact with and operates switch 293. It should be noted also that an extra spring 297 is provided on the switch to warn the operator that the switch-closing point of key depression has been reached, so, if the machine is not to be tripped by such key, such point may not be passed. Even with main switch 292 closed, the full amount may be set up on the keyboard and the machine set in operation by add motor bar 102. In case of subtraction, the key 92 is always used to initiate the machine cycle.

*Correction key*

A correction key 300 (Figs. 1 and 7) has been provided with a stem 301 with a slotted bent-over portion 302 (see also Fig. 12) mounted on slide studs 303 and 304. Key 300 normally is resiliently held in a left-most position by a spring 305 extending between stud 303 and an ear 306 depending from the slide. Another ear 307, extending downwardly from bent-over portion 302 is in line with surface 308 of top plate 161 of the pin carriage. On movement of the correction key 300 to the right, the pin carriage, wherever it may be, is returned to home position, restoring any pins that may have been set up. On release of the correction key, a new number may be set up on the pin carriage.

*Résumé of machine operation*

The operator first decides whether he wishes to have machine cycle initiation in add entries made under control of the digit keys or not. If the latter, switch 292 (Fig. 1) is moved to "off" position; that is to say, the main solenoid switch is opened. Items are then set up on the digit keys in the usual manner, and the machine operation is initiated with add motor bar 102 if the entry is to be one of addition or the subtract key 92 if the entry is to be one of subtraction. If an item set up is to be entered repeatedly, the "Repeat" lever 243 is set to "repeat" position before a machine operation is initiated, and then the add motor bar or the subtract key is operated the required number of times or held down while the machine continuously cycles the required number of times.

If machine operation in add entries is to be initiated either by the digit keys or by the add motor bar, the solenoid main switch 292 is moved to the "on" position. The number to be entered is then set up on the keys, digit by digit, beginning with the highest digit, as is usual in the operation of ten-key adding machines, the operator being careful not to depress any but the last digit key to be used to the point where the solenoid switch 293 is closed. As the last digit key is depressed, it is given full inward movement, which initiates a machine cycle in which the set-up amount is entered additively. If the amount is to be entered subtractively, the subtract key 92 is used to initiate the machine operation. Repeat operations are provided for by moving "Repeat" lever 243 to effective position before initiation of a machine cycle. Holding down a digit key will cause repeated cycling of the machine, just as will holding down either add motor bar 102 or subtract key 92.

Total-taking operations always are initiated by operating key 106, and sub-total-taking operations are always initiated by operating key 107.

While the form of mechanism herein shown and described is admirably adapted to fulfill the objects primarily stated, it is to be understood that it is not intended to confine the invention to the one form or embodiment herein disclosed, for it is susceptible of embodiment in various other forms.

What is claimed is:

1. In a calculating machine, a set of digit-representing keys mounted in the machine with stems arranged in a row, there being a key for each digit of the numerical notation on which the machine is based, each key having pivoted to its stem an interponent by-pass pawl, and each key being movable to a first stage where it controls the entry of data, and movable therebeyond to a machine-cycle-initiating stage; a pin carriage having rows of data-entering pins movable from an ineffective position to an effective position; means operable to index the pin carriage from a home position by steps whereby the rows of pins are brought successively opposite the interponents on the key stems, the movement of a key to the first stage causing the setting of the pin of associated value in alinement therewith to the effective position and additionally causing the indexing of the pin carriage a step to bring the next row of pins in alinement with the key stems, the interponent pawl of a depressed key pivoting out of the way when struck by the corresponding pin of said next row as the carriage is indexed; a main operating means for giving the machine a cycle of operation when such is initiated; a cycle-initiating means; and means operated by a key when moved to the cycle-initiating stage to operate the cycle-initiating means to cause a machine cycle.

2. The machine of claim 1 in which there are provided a totalizer; a differential means which is set by the pins in effective position during a machine cycle; and totalizer-engaging means effective during a machine cycle to enter the data set up on the differential into the totalizer.

3. The machine of claim 2 in which the amount set up on the differential means normally is entered into the totalizer additively.

4. The machine of claim 3 in which subtract controls are provided to be operated before the initiation of a machine cycle to change the entry of data to a subtract entry.

5. The machine of claim 4 in which the subtract controls when operated result in the initiation of a machine cycle.

6. The machine of claim 1 in which a motor bar is provided, said motor bar when operated causing the initiation of a machine cycle.

7. The machine of claim 1 in which means is provided for returning the pin carriage to home position at the completion of an entry, the by-pass pawl of a depressed key allowing such return.

8. In a calculating machine having a plurality of denominational rows of digit-representing pins individually movable from an ineffective position to an effective position where they control the entry of amounts into the machine during an operation thereof, a set of keys equal in number to the digits in a single denominational order, said keys having stems with pivoted pawls by which said pins may be moved to effective position, said keys being individually operable inwardly to a first stage in which the pawls on the key stems move the pins in alinement therewith to effective position, and said keys being individually movable farther inwardly to a cycle-initiating stage; an indexing means, operation of which moves the keys and the rows of pins relatively row by row, said indexing means being operated by operation of a key inwardly at least to the first stage; power means operable when initiated to drive the machine through a cycle of operation; cycle-initiating means operable to initiate a machine cycle; and starting means operated by inward movement of a key to the cycle-initiating stage to operate the cycle-initiating means, the pawls on the key stems allowing movement of the pin carriage without interference between a depressed key and pins in ineffective position.

9. The device of claim 8 in which the pins are held in a carriage movable from a home position by operation of the indexing means, said carriage and pins being returned to home position during the latter part of a machine cycle, said pawls being pivoted to allow such homeward movement of the carriage without interference between a key in depressed position and a pin in ineffective position.

10. The device of claim 9 in which an auxiliary means is provided to initiate a machine cycle in the event the digit keys are not used for that purpose.

11. The device of claim 8 in which an auxiliary means is provided to initiate a machine cycle in the event the digit keys are not used for that purpose.

12. The device of claim 8 in which the machine is provided with a totalizer, a differential means for entering data into the totalizer during a machine cycle under control of the pins which have been set to effective position, a totalizer-engaging means normally controlling entries of data into the totalizers to be additive, and subtract means for controlling the totalizer-engaging means so that entries will be made into the totalizer negatively.

13. The device of claim 12 in which the subtract means includes a subtract control key, operation of which, in addition to causing an entry to be made subtractively, causes the initiation of a machine cycle.

14. The device of claim 8 in which the starting means includes a machine trip means; a solenoid energizable for operating the trip means; and a normally open electric circuit for the solenoid which is closed by operation of a key to the cycle-initiating stage to energize the solenoid and thus initiate a machine cycle.

15. The device of claim 14 in which the circuit includes a main switch which may be opened to disable the solenoid-operated starting means, and in which there is provided a motor bar, operation of which will initiate a machine operation.

16. In a calculating machine having a plurality of denominational rows of digit-representing pins individually movable from an ineffective position to an effective position where they control the entry of amounts into the machine during an operation thereof, a set of keys equal in number to the digits in a single denominational order, said keys being individually operable inwardly to a first stage in which they move pins in alinement therewith to effective position, and movable farther to a machine-cycle-initiating stage; an indexing means, operation of which moves the keys and rows of pins relatively a row at a time, said indexing means being operated by inward operation of a key at least to the first stage; power means which, when a cycle of machine operation is initiated, drives the machine through a cycle of operation; cycle-initiating means operable to initiate a machine cycle; and means operated by operation of a key to the machine-cycle-initiating stage to operate the cycle-initiating means.

17. In a calculating machine, the combination of spaced numerical denominational orders of differentially-settable means; a power means for giving the differentially-settable means excursions of movement in cycles; a pin carriage having denominational order rows of pins settable individually from an ineffective position to an effective position where they may control the excursion of one or more of the differentially-settable means; indexing means operable to move the pin carriage from a home position past a setting station and past the differentailly-settable means, order by order; a set of keys equal in number to the number of digits in a denominational order, said keys each having a pin-setting station formation at the pin-setting station and being movable inwardly individually toward the pin carriage from an ineffective position to an effective position in which the numerically-associated pin then at the setting station is set to effective position, and each of said keys being movable to a further extent to a cycle-initiating position, the movement of a key inwardly indexing the pin carriage by one denominational order; and means operated by any of the keys when operated inwardly to said further extent to cause the power means to operate for a cycle in which the pins set to effective position control the extent of movement of the differentially-settable means with which they are then alined.

18. In a calculating machine having a pin carriage containing a plurality of spaced rows of digit-representing pins, which pins may be moved individually from an ineffective position to an effective position and vice versa, and mechanism operable to index the carriage from a home position pin row by pin row, past a pin-setting station, the combination therewith of one or more keys having stems alined along said pin-setting station, the pins of a row at pin-setting stations being alined with the stems of the associated keys, said keys being movable toward said pin carriage, a first stage of movement setting to effective position the pin in alinement therewith and operating the indexing mechanism to move the carriage by a row, the stem of each key having a pin-setting member thereon unyielding in a pin-setting movement, but yielding to pin carriage movement whereby the pin carriage may be indexed while the key is retained in pin-setting position, without interfering with pins in the next row as they come to the pin-setting station.

19. The device of claim 18 in which the pin-setting member of a key is a pivoted member which may be swung in the direction of pin carriage movement.

20. The device of claim 18 in which the pin-setting member of a key is a pivoted member which may swing in the direction of pin-carriage-indexing movement or in the opposite direction.

21. The device of claim 18 in which means is provided to return the pin carriage to home position, and in which the pin-setting member is a pivoted member which may swing in the direction of pin-carriage-indexing movement and also in the direction of pin-carriage-homing movement.

22. The device of claim 18 in which the key stems project through guide slots in a guide member and in which the pin-setting members are pivoted members which have shoulders which bear against the under side of the guide member when the key is in unoperated position, holding the pivoted members in alinement with the associated keys and unyielding to pivotal forces, and in which the movement of a key to pin-setting and pin-carriage-indexing position causes the shoulders of the associated pivoted members to move away from the guide plate so that the pivoted member may swing in the direction of pin carriage movement and vice versa.

No references cited.